US006289354B1

(12) United States Patent
Aggarwal et al.

(10) Patent No.: US 6,289,354 B1
(45) Date of Patent: Sep. 11, 2001

(54) SYSTEM AND METHOD FOR SIMILARITY SEARCHING IN HIGH-DIMENSIONAL DATA SPACE

(75) Inventors: Charu Chandra Aggarwal, Yorktown Heights; Brent Tzion Hailpern; Joel Leonard Wolf, both of Katonah; Philip Shi-Lung Yu, Chappaque, all of NY (US)

(73) Assignee: International Business Machines Corporation, Armonk, NJ (US)

( * ) Notice: Subject to any disclaimer, the term of this patent is extended or adjusted under 35 U.S.C. 154(b) by 0 days.

(21) Appl. No.: 09/167,332

(22) Filed: Oct. 7, 1998

(51) Int. Cl.[7] ................................................. G06F 17/30
(52) U.S. Cl. ................................. 707/104; 707/5; 707/6
(58) Field of Search .................... 707/1, 5, 10, 100–104, 707/200–206; 341/55

(56) References Cited

U.S. PATENT DOCUMENTS

| | | | |
|---|---|---|---|
| 5,577,241 | * | 11/1996 | Spencer ..................................... 707/5 |
| 5,977,890 | * | 11/1999 | Rigoutsos et al. ...................... 341/55 |
| 6,092,065 | * | 7/2000 | Floratos et al. .......................... 707/6 |
| 6,108,666 | * | 8/2000 | Floratos et al. ....................... 707/104 |

OTHER PUBLICATIONS

R. Sibson, "SLINK: An Optimally Efficient Algorithm for the Single–Link Cluster Method", *The Computer Journal*, The British Computer Society, vol. 16, No. 1, Feb. 1973.

Tian Zhang et al., "BIRCH: An Efficient Data Clustering Method for Very Large Databases", Proceedings of the ACM SIGMOND International Conference on Management of Data, Montreal, Canada, Jun. 1996, pp. 103–114.

Raymond, T. Ng et al., "Efficient and Effective Clustering Methods for Spatial Data Mining", Proceedings of the 20th International Conference on Very Large Data Bases, Santiago, Chile, 1994, pp. 144–155.

Nick Roussopoulos et al., "Nearest Neighbor Queries", Proceedings of the ACM–SIGMOD International Conference on Management of Data, 1995, pp. 71–79.

Stefan Berchtold et al., "Fast Nearest Neighbor Search in High–dimensional Space", Proceedings of the International Conference on Data Engineering, Feb. 1998, pp. 209–218.

David A. White et al., "Similarity Indexing with the SS–Tree", Proceedings of the 12th International Conference on Data Engineering, New Orleans, U.S.A., Feb. 1996, pp. 516–523.

Stefan Berchtold et al., "The X–Tree: An Index Structure for High–Dimensional Data", Proceedings of the 22nd International Conference in Very Large Databases, 1996, pp. 28–39.

Douglas H. Fisher, "Knowledge Acquisition Via Incremental Conceptual Clustering", Machine Learning 2(2), 1987, pp. 139–172.

Mohamed Zait et al., "A Comparative Study of Clustering Methods", FGCS Journal, Special Issue on Data Mining, 1997, pp. 149–159.

Samet H., Design and Analysis of Spatial Datastructures, Addison Wesley, 1993, pp. 135–141.

* cited by examiner

*Primary Examiner*—Ruay Lian Ho

(57) ABSTRACT

Information is analyzed in the form of a plurality of data values that represent a plurality of objects. A set of features that characterize each object of the plurality of objects is identified. The plurality of data values are stored in a database. Each data value corresponds to at least one of the plurality of objects based on the set of features. Ones of the plurality of data values stored in the database are partitioned into a plurality of clusters. Each cluster of the plurality of clusters is assigned to one respective node of a plurality of nodes arranged in a tree hierarchy. Ones of the plurality of nodes of the tree hierarchy are traversed. If desired, information may be analyzed for finding peer groups in e-commerce applications.

30 Claims, 11 Drawing Sheets

SYSTEM AND METHOD FOR SIMILARITY SEARCHING IN HIGH-DIMENSIONAL DATA SPACE

FIELD OF THE INVENTION

The present invention relates generally to searching high-dimensional databases. In particular, related information in a database is identified by performing a similarity search. Furthermore, the present invention relates to performing a nearest-neighbor similarity search to find instances in the database that are similar to a target instance.

BACKGROUND OF THE INVENTION

It is often desirable to detect related instances in a database that correspond to related information. Instances of information are represented and stored in a database in the form of a set of data values (feature vectors) in a multidimensional space. A dimension in the multidimensional space is a feature that characterizes objects represented by the data values. For example, consider the database of a credit card company containing customer information. Each customer is an object corresponding to an instance in the database that is a customer profile, or data value, in the multidimensional feature space of the database. Each data value is an n-tuple corresponding to an instance features, such as, age, sex, and salary. The dimensions of the multidimensional feature space are the features that characterize the customer namely the age, sex, and salary, as well as other information.

The nearest-neighbor problem is the problem of performing a similarity search to find related ("similar") instances of information in the database. Data values in the database are deemed related if they lie a short distance from each other in the multidimensional feature space of the database. Specifically, the nearest-neighbor problem is that of finding the data value or set of k data values in the database that is closest ("similar"), in the sense of a distance metric, to a given target value.

The nearest-neighbor problem is an important problem with applications in data mining, collaborative filtering, and multimedia image database searching. See, for example, Roussopoulos N., Kelley S., and Vincent F., "Nearest neighbor Queries", Proceedings of the ACM-SIGMOD International Conference on Management of Data, pp. 71–79, 1995. Data mining involves extracting structured information from large amounts of raw data. For example, a database belonging to a credit card company may contain demographic information including age, sex, and salary. By finding entries in the database with similar demographics it may be possible to deduce the risk associated with a particular debt. Collaborative filtering involves deducing the preferences of a given user by examining information about the preferences of other similar users. For example, suppose that customers of a music Compact Disc (CD) distributor asks customers to rank the CDs they like. If the distributor sells many different CDs, then it is likely that customers may not spend the time to rank all of the CDs available. For the purposes of marketing and sales promotions it may be desirable to try to predict the rank a particular customer may give to a particular CD, when the particular CD had not been previously ranked by that customer. Such a prediction may be produced, for example, by the average ranking of that particular CD, by other customers with similar characteristics to the particular customer.

Another example of an application of the nearest-neighbor problem is a text similarity search. For a given target web page, it may be desirable to find all other pages which are similar to it. Suppose that web pages are described in terms of keywords. In this case, a feature corresponds to a keyword. Finding the nearest-neighbor can be achieved by identifying keywords in the target and then finding neighbor WebPages based on the identified keywords.

Similarity searching may also be an important tool for image database applications. It may be useful to allow a user to search an image database for similar images. Features of an image may represent information related to color histograms, texture, luminescence, chrominescence or other characteristics of an image. Images may be deemed similar based on the likeness of image features.

Various methods for finding nearest-neighbors have been proposed, see for example, Roussopoulos N., Kelley S., and Vincent F., "Nearest neighbor Queries", Proceedings of the ACM-SIGMOD International Conference on Management of Data, pp. 71–79, 1995; Berchtold S., Keim D., and Kriegel H. P., "The X-Tree: An Index Structure for High Dimensional Data", Proceedings of the $22^{nd}$ International Conference in Very Large Databases, pp. 28–39, 1996; and Berchtold S., Ertl B., Keim D. A., Kriegel H. P., and Seidel T., "Fast Nearest Neighbor Search in High-dimensional space", Proceedings of the International Conference on Data Engineering, pp. 209–218, February, 1998. These previously proposed methods, however, do not allow the flexibility of performing similarity searches based on a subset, specified by a user, of the set of attributes characterizing objects represented by the data values in the database. Further, these previously proposed methods do not allow for the flexibility of identifying an entry in a database that is most similar to a multiplicity of target entries. Moreover, some of the previously proposed methods do not allow a user to search for more than one entry in the database that is similar to a given target entry.

SUMMARY OF THE INVENTION

Information is analyzed in the form of a plurality of data values that represent a plurality of objects. A set of features that characterize each object of the plurality of objects is identified. The plurality of data values are stored in a database. Each data value corresponds to at least one of the plurality of objects based on the set of features. Ones of the plurality of data values stored in the database are partitioned into a plurality of clusters. Each cluster of the plurality of clusters is assigned to one respective node of a plurality of nodes arranged in a tree hierarchy. Ones of the plurality of nodes of the tree hierarchy are traversed.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
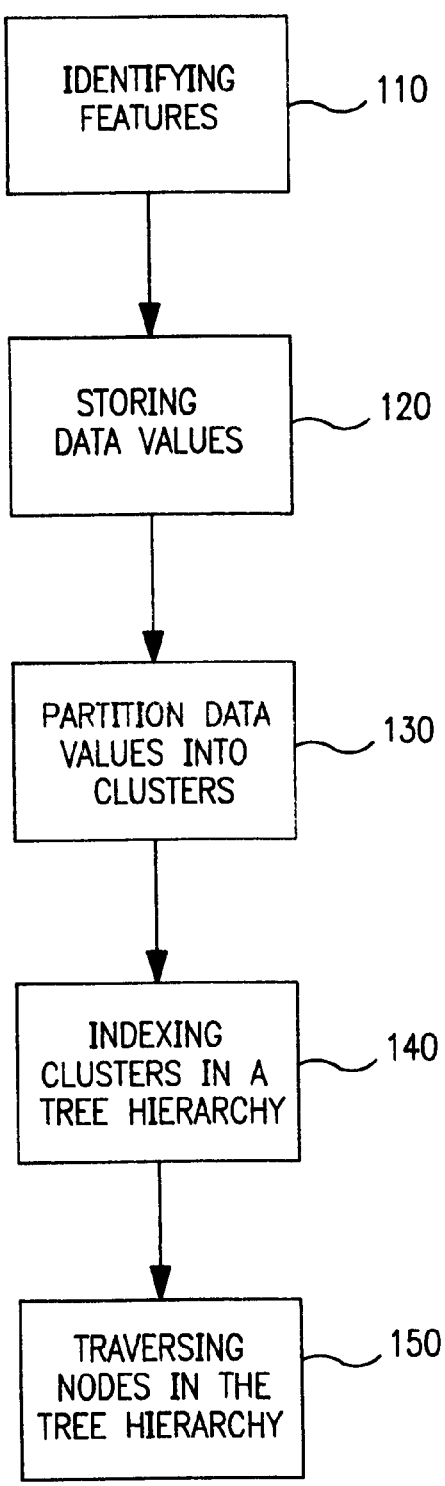
FIG. 1 is a flow chart diagram which is useful for explaining a method of analyzing information in a database in accordance with an exemplary embodiment of the present invention.

FIG. 1 is a flow chart diagram which is useful for explaining a method of analyzing information in a database in accordance with an exemplary embodiment of the present invention. The method summarized by the flow chart diagram of FIG. 1 is a method of analyzing information characterizing a physical plurality of objects. A set of features of the physical objects are identified in step 110. For example, objects may correspond to people, and features characterizing objects may correspond to age, sex, salary, and social insurance number. In step 120 the information characterizing each object is stored in a database as data values. A data value represents an instance of the set of features as measured from a physical object. For example, if objects are people and if the set of features includes sex then instances of sex would be either male or female depending of the particular person. Thus, the vector (35, female, 80, 001-02-0003) is an example of a data value representing an instance of the set of features {age, sex, salary, social insurance number} corresponding to a 35 year old female person, with a salary of 80 thousands of a currency, and with social insurance number 001-02-0003. Note that it is herein assumed that all features may be given a numerical value. For example, the instances of sex, male and female may be given numerical values 0, 1 respectively.

In step 130 data values stored in the database are partitioned into clusters of information. Consider, for example, a database belonging to a car insurance agent. The objects in the database are people and the set of features includes: age, sex, marital status, number of accidents, and year vehicle owned was manufactured. An example of a cluster of information in this scenario may be a group of people that are close in age and in the number of accidents they have been involved in. The data values corresponding to this group of people are associated with the features {age, number of accidents}.

A cluster, written symbolically herein as a pair C=(F,P), is in this context a subset of data values, say P, and a subset of the set of features, say F, such that the elements of the subset of data values, $\forall p \in P$, are close to each other in the sense of some metric taken with respect to the subspace associated with F. The metric defining the sense of distance in the data-space of the database and the subset of interesting features F may be specified by a user.

Two possible metrics for calculating distances between data values are the Manhattan metric and the Euclidean metric. The Euclidean distance between two data values $m=(m_1, \ldots, m_r)$ and $n=(n_1, \ldots, n_r)$ (for r interesting features) is given by $$\sqrt{\sum_{i=1}^{r}(m_i - n_i)^2}. \qquad (1)$$

The Manhattan distance (for r interesting features) is given by $$\sum_{i=1}^{r}|m_i - n_i|. \qquad (2)$$

A method in accordance with the present invention may be implemented with various metrics including the Euclidean metric and the Manhattan distance. In general, the $L_p$ norm induced distance metric between two data values $m=(m_1, \ldots, m_r)$ and $n=(n_1, \ldots, n_r)$ (for r interesting features) is defined as $$\|m-n\|_p = \left[\sum_{i=1}^{r}|m_i - n_i|^p\right]^{1/p}. \qquad (3)$$

Partitioning of the data values into clusters may be accomplished using any clustering technique. The clustering problem has been discussed in the literature of both the statistical and database communities. Two known algorithms for finding clusters in large databases are the BIRCH and CLARANS algorithms, see, for example, T. Zhang, R. Ramakrishnan and M. Livny, "BIRCH: An Efficient Data Clustering Method for Very Large Databases", Proceedings of the ACM SIGMOD International Conference on Management of Data, pp. 144–155, Montreal, Canada, June 1996; and R. Ng and J. Han, "Efficient and Effective Clustering Methods for Spatial Data Mining", Proceedings of the 20th VLDB Conference, Santago, Chile, 1994, pp. 144–155.

Figure 2:
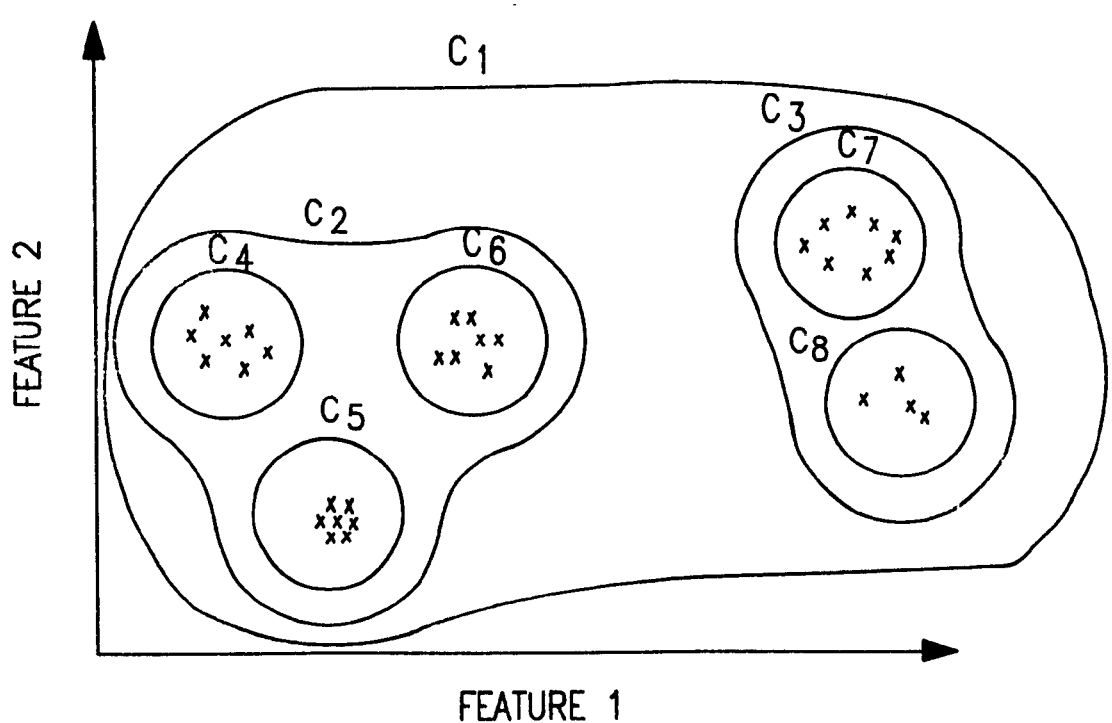
FIG. 2 shows an exemplary hierarchical structure of clusters with respect to a subset of two interesting features.

Once data values are partitioned into a set of clusters, each cluster may itself be partitioned in turn into another set of clusters (sub-clusters). Thus, the set of data values may be partitioned, recursively, forming a hierarchical structure of clusters. FIG. 2 shows an exemplary hierarchical structure of clusters with respect to a subset of two interesting features. FIG. 2 shows eight clusters labeled $C_1$ through $C_8$. $C_1$ is the largest cluster and includes all others as sub-clusters. $C_1$ is itself partitioned into two sub-clusters $C_2$ and $C_3$. Finally, $C_2$ is partitioned into three sub-clusters $C_4$, $C_5$, and $C_6$, and $C_3$ is partitioned into two sub-clusters $C_7$ and $C_8$. In general, data values in the database may be recursively partitioned into hierarchical clusters until each cluster, at the lowest level of the hierarchy (e.g. $C_4$, $C_5$, $C_6$, $C_7$, $C_8$ of FIG. 2), includes less than a predetermined number of data values. In the finest possible partition each cluster, at the lowest level of the hierarchy, contains a single data value. Note that in some cases it may be desirable to leave a set of data values out of the partition. Data values that are not involved in the partition may be termed 'outliers'. 'Outliers' do not naturally lie in a partition and represent data values that may be considered as "noisy data". 'Outliers' may be analyzed separately from the rest of the data values.

Figure 3:
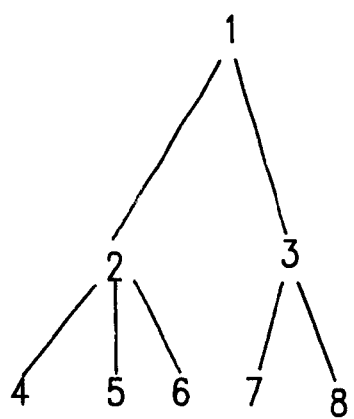
FIG. 3 shows an exemplary tree hierarchy, indexing the clusters of FIG. 2.

In step 140 the hierarchical cluster partition formed in step 140 is indexed by assigning each cluster a node of a tree hierarchy. FIG. 3 shows an exemplary tree hierarchy, indexing the clusters of FIG. 2. In FIG. 3 cluster $C_i$ is assigned to node $i \in \{1, \ldots, 8\}$ of the tree hierarchy. The highest level node of the tree hierarchy, for example node 1 in FIG. 3, is referred to as the root, while the lowest level node(s) of the tree hierarchy are referred to as leaves, for example nodes 4, 5, 6, 7, and 8 in FIG. 3.

In step 150 the nodes of the tree hierarchy are traversed in order to find a desired element in the database. For example, the tree hierarchy may be used as an index to the data values partitioned into clusters and sub-cluster. A tree-search algorithm such as a branch and bound method may then be applied to search the database.

BRANCH AND BOUND

The nearest-neighbor problem may be solved with a branch and bound method. Branch and bound methods are classical techniques from combinatorial optimization. To apply a branch and bound method, data values in the multidimensional data-space are arranged hierarchically in either an index tree, indexing data values as singletons, or a cluster tree, indexing clusters of data values in a tree hierarchy as described above. The tree may then be searched by pruning branches. Pruned branches are branches that need not be searched, as they index data values or clusters of data values which are a greater distance from the target value(s) than an estimated (global) upper bound. In other words, pruned branches index data values that are known to be farther away from the target value(s) than other data values in the data space. Each node in the tree may be associated with a (local) upper bound as well as a (local) lower bound. The bounds may be computed by estimating the largest and smallest distances, respectively, between the target value(s) and clusters of data values indexed by lower level nodes or sub-nodes.

A nearest-neighbor ("similarity") search may be performed by traversing the tree hierarchy in a particular order, for example, breadth or depth first search. A current (global) upper bound value represents the estimated distance from the target(s) to the nearest-neighbor(s). During tree traversal the current upper bound may be compared with the (local) lower bound associated with the current node in the tree. If the current node is associated with a lower bound that is greater than the current (global) upper bound then the current node, and hence all of its sub-nodes, are pruned. The efficiency of the branch and bound method may depend on the partition of the data values into clusters and on the "tightness" of the (local) lower and upper bounds. The order of traversal of the nodes in the tree may affect the running time of the method in a computer. Table 1 contains an exemplary recipe for performing a nearest-neighbor search using a branch and bound technique in accordance with an embodiment of the present invention.

TABLE 1

Nearest-Neighbor Search with Branch and Bound

```
Procedure BranchAndBound(Target:t; TreeHierarchy: T)
    Begin
    Initialize CurrentUpperBound to the minimum of the distances
    from Target t to a random sample of data values in the data-space;
    Examine the nodes in the tree hierarchy T one by one in a given
    order (e.g. depth first search);
            for each node n do
                begin
                if node n is a leaf then
                    begin
                    for each data value p indexed by node n
                    if Distance(p, t) < CurrentUpperBound then
                    CurrentUpperBound = Distance(p, t);
                    End
                Else
                    Begin
                    LB(n) = lower bound of distance from target
                        t to the Cluster indexed by node n;
                    UB(n) = upper bound from target t to the
                        cluster Indexed by node n;
                    if UB(n) < CurrentUpperBound then
                            CurrentUpperBound =
                                UB(n);
                    if LB(n) > CurrentUpperBound then node n
                    and all its sub-nodes can be pruned;
                    end
                end
    end
```

Note that with minor adjustments the above methodology may also be applied to performing 'furthest-neighbor' searches.

ESTIMATING (LOCAL) BOUNDS BY ENCAPSULATION

The use of branch and bound methods for nearest-neighbor searching has been explored, for example, in Roussopoulos N., Kelley S., and Vincent F., supra. Conventional methods, such as the use of R-trees (see for example Roussopoulos N., Kelley S., and Vincent F., supra) rely on indexing arrangements which partition the data-space into minimum bounding rectangles oriented along predefined directions. The direction of orientation of the rectangles is typically parallel to the axes. The use of such minimum bounding rectangles allows for relatively quick calculation of the (local) lower and/or upper bounds. It is relatively simple to estimate the nearest and/or farthest distances between such rectangles and a target value. Hence, such bounding rectangles facilitate calculation of an estimate for a (local) upper and/or lower bound of the distance from a cluster of data values to a target value.

Figure 4:
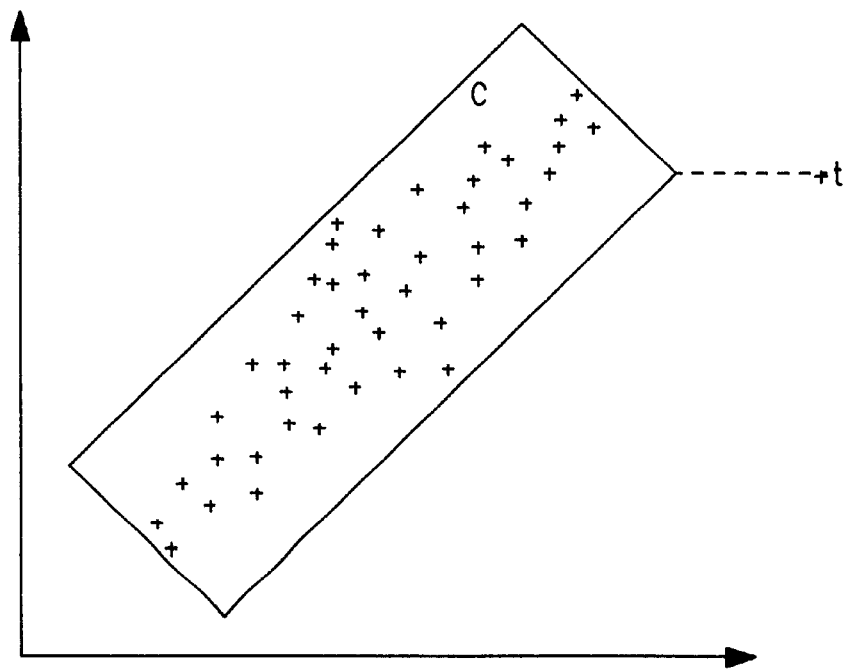
FIG. 4 shows an estimate of the (local) lower bound from a target value t, obtained using a bounding rectangle to encapsulate cluster C.
Figure 5:
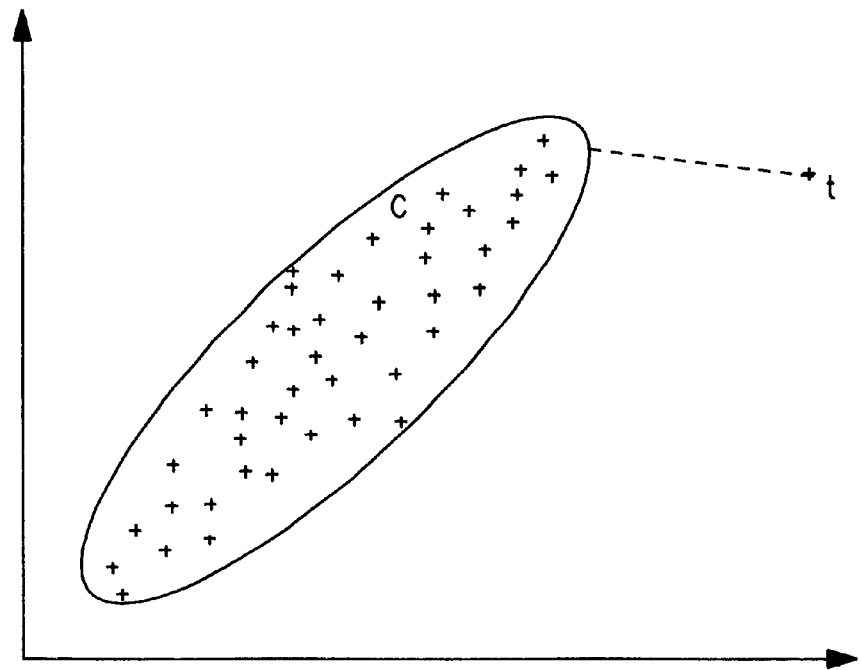
FIG. 5 shows an estimate of the (local) lower bound from a target value t, obtained using a bounding ellipse to encapsulate cluster C.

This approach, however, is problematic in that such minimum bounding rectangles may occupy significantly more volume (in the data-space) than the volume occupied by the enclosed cluster. Thus, the use of bounding rectangles may degrade the "tightness" of the bounds. For example, FIG. 4 shows an estimate of the (local) lower bound from a target value t, obtained using a bounding rectangle to encapsulate cluster C. FIG. 5 shows an estimate of the (local) lower bound from a target value t, obtained using a bounding ellipse to encapsulate cluster C.

To improve the calculation of "tight" (local) lower bound estimates, of the distance between a target point and a cluster, it may be desirable to approximate the shape of a cluster by an ellipsoid shape oriented along an arbitrary direction. Further, it may also be desirable to approximate ellipsoidal bounding capsules using an intersection of hyperspheres.

FINDING RECTANGULAR CAPSULES FOR CLUSTERS

Suppose that cluster C can be written as $\{x_i \in \Re^n : i=1, \ldots, m\}$, i.e. cluster C includes m data values in an n dimensional data-space. Let the centroid of cluster C be given by $$\bar{x} = \frac{1}{m}\sum_{i=1}^{m} x_i.$$

In high dimensional data-spaces it may be the case that data values are sparse and correlated. Correlation between data values may cause the values to align along certain hyperplanes. To find rectangular capsules one may first seek to find at most n hyperplanes associated with cluster C. These n hyperplanes may be found by calculating the eigenvectors of the covariance matrix for the cluster, where the covariance matrix is given by $$\begin{pmatrix} cov(x_1, x_1) & cov(x_1, x_2) & \cdots & cov(x_1, x_n) \\ cov(x_2, x_1) & cov(x_2, x_2) & \cdots & cov(x_2, x_n) \\ \vdots & \vdots & & \vdots \\ cov(x_n, x_1) & cov(x_n, x_2) & \cdots & cov(x_n, x_n) \end{pmatrix}, \quad (4)$$

where $cov(x_i, x_j) = (x_i - \bar{x})^T (x_j - \bar{x})$.

By the Principal Axes Theorem, a (real) symmetric matrix (of order n) has n real eigenvectors that form an orthonormal basis of $\Re^n$, say $a^1, \ldots, a^n$. The eigenvectors may either be derived from a constructive proof of the Principal Axes Theorem, or, for example, by use of Singular Value Decomposition (SVD). The n hyperplanes sought may be defined by $$a^i \cdot x = b^i \text{ (annotated herein } [a^i, b^i]), \; i=1, \ldots, n,$$

where $b^i$ are given by $$a^i \cdot \bar{x} = b^i, i=1, \ldots, n. \quad (5)$$

Let $r^i$ denote the average (orthogonal) distance from the data values of cluster C to the hyperplane $[a^i, b^i]$. For $\epsilon > 0$, let $R_i^\epsilon(C)$ be the region of the data-space enclosed between $[a^i, b^i - r^i \cdot \epsilon]$ and $[a^i, b^i + r^i \cdot \epsilon]$. A rectangular capsule parameterized by $\epsilon$ is given by $$R^\epsilon(C) = \bigcap_{i=1}^{m} R_i^\epsilon(C). \quad (6)$$

The parameter $\epsilon$ controls the size of rectangular capsule $R^\epsilon(C)$. For each data value $x_i \in C$, let the value $\epsilon(x_i)$ denote the smallest rectangular capsule such that $x_i \in R^{\epsilon(x_i)}(C)$. Let $$\bar{\epsilon} = \frac{1}{m}\sum_{i=1}^{m} \epsilon(x_i),$$

the average value of $\epsilon(x_i)$ for all point in C, and let $$\bar{\sigma} = \frac{1}{m}\sum_{i=1}^{m} (\epsilon(x_i) - \bar{\epsilon})^2,$$

the standard deviation of the values of $\epsilon(x_i)$ for all points in c.

Let $$\epsilon^* = \max_{1 \le i \le m} \epsilon(x_i).$$

A rectangular bounding capsule for cluster C, $R^*(C)$, may be chosen as the smaller of $R^{\epsilon^*}(C)$ and $R^{\bar{\epsilon}+3\cdot\bar{\sigma}}(C)$. $R^*(C)$ may contain most of the data values in cluster C. The data values of cluster C which are not contained in $R^*(C)$ may be considered "outliers", and may be handled separately.

Since rectangular capsule $R^*(C)$ is aligned along hyperplanes so as to minimize average distances to data values of cluster C, the volume of the capsule may be relatively small. As explained above, minimizing the volume of the capsule, while capturing most of the data values in the associated cluster, helps to calculate "tight" (local) upper and lower bound estimates. "Tighter" upper and lower bound estimates may result in more efficient pruning, in the course of performing the branch and bound method.

Each cluster in a partition may be associated with a coordinate transformation T(C) (rotations and translation). T(C) transforms the coordinate system such that the rectangular capsule C is aligned with the axes in the positive quadrant, with one corner at (0, 0, 0 . . . 0), in the new coordinate system. Such a transformation may be uniquely determined by: the centroid of the given cluster, the set of orthogonal hyperplanes ($[a^i, b^i]$, i=1, . . . , n), and the volume of rectangular capsule $R^*(C)$. Note that the memory space needed to store the transformation T(C) is proportional to the number of dimensions n, as is the computation time to transform any data value to the new coordinate system.

FINDING ELLIPSOIDAL CAPSULES FOR CLUSTERS

Rectangular capsules have the disadvantage that when the Euclidean metric is used to evaluate distances, the rectangular capsule may not well approximate the shape of a cluster. Hence, it may be desirable to find spherical type shapes to encapsulate clusters. Ellipsoidal capsules may provide better (local) lower bound estimates on distances to clusters. As in the foregoing, hyperplanes may be determined to assist in aligning the principal axes of the ellipsoids. The axes of an ellipsoid may be set to be the normals $a^1, \ldots, a^n$ of the hyperplanes generated as discussed above.

The center of an ellipsoid encapsulating cluster C may be set to coincide with the centroid $\bar{x}$. For simplicity the equation of ellipsoids is written herein in the coordinate system defined by the orthogonal hyperplanes. As in the above, let $r^i$ denote the average (orthogonal) distance from the data values of cluster C to the hyperplane $[a^i, b^i]$. An ellipsoidal capsule, written $E^\epsilon(C)$, for cluster C, parameterized by the variable $\epsilon$, is given by:

$$\frac{z_1^2}{r_1^2} + \frac{z_2^2}{r_2^2} + \ldots + \frac{z_n^2}{r_n^2} \le \epsilon^2. \quad (7)$$

As in the foregoing, parameter $\epsilon$ controls the size of ellipsoidal capsule $E^\epsilon(C)$. For each data value $x_i \in C$, let the value $\epsilon(x_i)$ denote the smallest ellipsoidal capsule such that $x_i \in E^{\epsilon(x_i)}(C)$. Let $\bar{\epsilon}, \bar{\sigma}$, and $\epsilon^*$ be defined as in the foregoing. A ellipsoidal bounding capsule, $E^*(C)$, for cluster C may be chosen as the smaller of $E^{\epsilon^*}(C)$ and $R^{\bar{\epsilon}+3\cdot\bar{\sigma}}(C)$. $E^*(C)$ may contain most of the data values in cluster C. The data values of cluster C which are not contained in $E^*(C)$ may be considered "outliers", and may be handled separately.

CALCULATING (LOCAL) UPPER AND LOWER BOUNDS—DISTANCE TO A CAPSULE

While searching the tree hierarchy, it may be desirable to calculate estimates for the upper and lower bounds, respectively, of the distance from a target value t to a particular cluster C. For each cluster, assigned to a node of the tree hierarchy, a transformation T(C) is applied target value t. T(C) transforms the target t to a new coordinate system in which the capsule is aligned with the axes.

Given a capsule the maximum or minimum distances to the capsule from the target value t may be determined by solving a constrained optimization problem. For a metric (that is invariant under the transformation T(C)), such as, for example, the Euclidean metric, the problem(after coordinate transformation) may be defined as follows:

$$\max_{z}(\min)\|z - t\| \tag{8}$$

subject to:

$$0 \leq z_i \leq 2 \cdot r_i \cdot \varepsilon \quad \text{(for rectangular capsules), or} \tag{A}$$

$$\frac{z_1^2}{r_1^2} + \frac{z_2^2}{r_2^2} + \ldots + \frac{z_n^2}{r_n^2} = \varepsilon^2 \quad \text{(for ellipsoidal capsules),} \tag{B}$$

where parameter $\epsilon$ determines the volume of the capsule, and where $z=(z_1,z_2,\ldots,z_n)^T$. The notation $\|\cdot\|$ designates the metric. In the case of the Euclidean metric, for example, $$\|z - t\| = \sum_{i=1}^{n}(z_i - t_i)^2,$$

where $t=(t_1,t_2,\ldots,t_n)^T$. The solution to case (A) (rectangular capsules) is given in table 1 below.

TABLE 2

| Value of $t_i$ | Min value for $z_i$ | Max value for $z_i$ |
| --- | --- | --- |
| $t_i < 0$ | $z_i = 0$ | $z_i = 2 \cdot r_i \cdot \epsilon$ |
| $0 \leq t_i \leq 2 \cdot r_i \cdot \epsilon$ | $z_i = t_i$ | $z_i = \max\{t_i, 2 \cdot r_i \cdot \epsilon - t_i\}$ |
| $t_i > 2 \cdot r_i \cdot \epsilon$ | $z_i = 2 \cdot r_i \cdot \epsilon$ | $z_i = 0$ |

The solution to the ellipsoidal case, case (B), the following optimality criterion may be obtained by the application of the Kuhn-Tucker conditions. These yield, $$z_i = \frac{t_i}{1 - \frac{\lambda}{r_i^2}}, \tag{9}$$

where $\lambda$ is free. To solve for $\lambda$, and hence the distance, the right hand side of equation (9) may be substituted into condition (B) above. The resulting equation may then be solved for $\lambda$. Such an equation, however, may be difficult to solve for $\lambda$ in closed form.

BOUNDING CAPSULES AS INTERSECTIONS OF HYPERSPHERES

It may be desirable to bound clusters with capsules that are formed by an intersection of hyperspheres. These bounding capsules may be considered a variation of ellipsoidal capsules. First the orthogonal hyperplanes $[a^i, b^i]$ ($i=1, \ldots, n$) are calculated as above. Without loss of generality, one may assume the average distance $r_i$ from the data values of cluster C to the $i^{th}$ hyperplane are sorted. In other words, one may assume that $r_1 \leq r_2 \leq \ldots \leq r_n$. The set $\{r_1, r_2, \ldots, r_n\}$ into $k \leq n$ mutually disjoint subsets, $$\{r_1, \ldots, r_{j_1}\}, \{r_{j_1+1}, \ldots, r_{j_2}\}, \ldots, \{r_{j_{k-1}+1}, \ldots, r_n\}.$$

Further, $j_0 = 1 \leq j_1 \leq \ldots \leq j_{k-1} \leq n = j_k$ may be chosen such that the minimum to maximum ratio of values of $r_i$ in any subset is no larger than 2, i.e.

$$\frac{r_{j_1}}{r_{j_0}} \leq 2 \tag{10}$$

$$\frac{r_{j_2}}{r_{j_1+1}} \leq 2$$

$$\ldots$$

$$\frac{r_{j_n}}{r_{j_{k-1}+1}} \leq 2.$$

For example, consider a 10-dimensional space in which the set $\{r_1, r_2, \ldots, r_n\} = \{1, 2, 3, 5, 8, 12, 16, 22, 26, 40\}$. In this case, $\{r_1, r_2, \ldots, r_n\}$ may be divided into the following four subsets: $\{1, 2\}$, $\{3, 5\}$, $\{8, 12, 16\}$, and $\{22, 26, 40\}$. For each of the subsets it is possible to introduce spherical constraints, rather than the elliptical type constraint introduced in equation (7). Thus, cluster C may be approximated by a bounding capsule having a volume defined by following constraints:

$$z_1^2 + \ldots + z_{j_1}^2 \leq \varepsilon_1^2 \tag{11}$$

$$z_{j_1+1}^2 + \ldots + z_{j_2}^2 \leq \varepsilon_2^2,$$

$$\ldots$$

$$z_{j_{k-1}+1}^2 + \ldots + z_{j_k}^2 \leq \varepsilon_k^2$$

where $\epsilon_1, \epsilon_2, \ldots, \epsilon_k$ may be determined as discussed in relation to rectangular and ellipsoidal capsules above, and the constraints are in the proper coordinate system. As discussed above it may be desirable to form bounding capsules with as small a volume as possible, while enclosing as many data values of the associated clusters as possible. Thus, in general, it is desirable to form equations (11) with $\epsilon_1, \epsilon_2, \ldots, \epsilon_k$ as small as possible, while enclosing as many data values of the associated cluster as possible. Let $t=(t_1, t_2, \ldots, t_n)^T$ denote a target value (possibly after coordinate transformation). The nearest or farthest distance to the surface of the convex shape may be calculated by solving the following optimization problem:

$$\max_{z}(\min)\|z - t\| \text{ subject to equations (11)}.$$

This optimization problem may be decomposed into k different sub-problems. Each sub-problem involves optimization (maximization or minimization) of a distance from a point to a spherical surface. The sub-problems may be solved in closed form, and hence implemented efficiently with a branch and bound method.

Figure 6A:
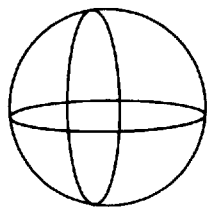
FIGS. 6(a)–6(d) illustrate shapes of spherical bounding capsules in 3 dimensions in accordance with an embodiment of the present invention.
Figure 6B:
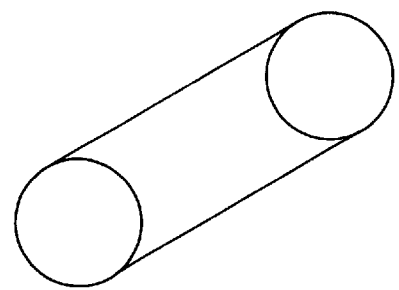
Figure 6C:
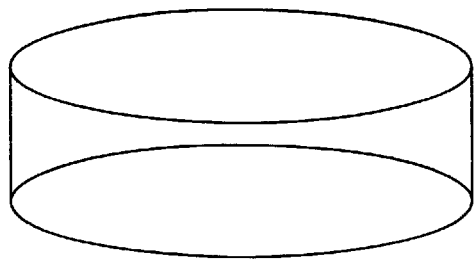
Figure 6D:
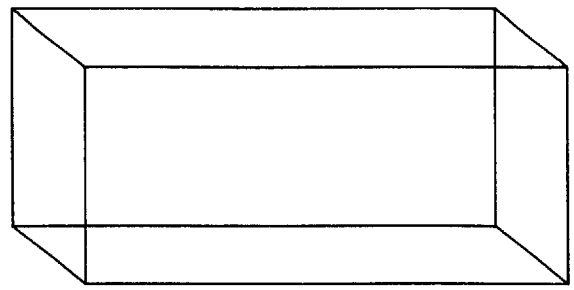

In 3 dimensions the shapes created by the above division of the set $\{r_1, r_2, r_3\}$ may be spherical (ball like), cylindrical, disc like, or rectangular (box like) depending on the $r_i$'s. Suppose, $r_1<r_2<r_3$. FIG. 6(a) illustrates the case where $$\frac{r_3}{r_1} < 2$$

and the set $\{r_1, r_2, r_3\}$ is not divided. In this case, the shape generated is ball like. FIG. 6(b) illustrates the case where $$\frac{r_3}{r_1} > 2, \quad \frac{r_2}{r_1} < 2$$

and the set $\{r_1,r_2,r_3\}$ is divided into the subsets $\{r_1,r_2\}$ and $\{r_3\}$. In this, case the shape generated is cylindrical. FIG. 6(c) illustrates the case where $$\frac{r_2}{r_1} > 2, \quad \frac{r_3}{r_2} < 2$$

and the set $\{r_1,r_2,r_3\}$ is divided into the subsets $\{r_1\}$ and $\{r_2,r_3\}$. In this case, the shape generated is disc like. FIG. 6(d) illustrates the case where $$\frac{r_2}{r_1} > 2, \quad \frac{r_3}{r_2} > 2$$

and the set $\{r_1,r_2,r_3\}$ is divided into the subsets $\{r_1\}$, $\{r_2\}$, and $\{r_3\}$. In this case, the shape generated is rectangular. For example, when $\{r_1,r_2,r_3\}=\{3,9,12\}$, the set may be divided into $\{3\}$ and $\{9,12\}$. Therefore the bounding capsule for the cluster is a disc like shape defined by $$z_1^2 \leq \epsilon_1^2$$
$$z_2^2+z_3^2 \leq \epsilon_2^2.$$

CALCULATION OF RADII FOR HYPERSPHERES

The radii of the hyperspheres for cluster encapsulation (i.e. $\epsilon_i$'s in equation (11) above) may be calculated by a method similar to that detailed in the foregoing discussion of rectangular and ellipsoidal capsules. In the case of rectangular and ellipsoidal clusters, the scalar $\bar{\epsilon}+3\cdot\bar{\sigma}$ was used as an upper bound to control the size of capsule $R^*(C)$ or $E^*(C)$. This bound may not be appropriate for spherical capsules, as it may lead to capsules with a volume that is significantly greater than the approximated cluster. The scalar $\bar{\epsilon}+3\cdot\bar{\sigma}$ is an appropriate bound for the size of a capsule if one assumes that the distances between the centroid and the data values in the cluster are normally distributed. For hypersphere like clusters, however, many of the data values may be concentrated near the outer shell or surface of the hypersphere. Thus, for hyperspheres, the assumption of normally distributed distances from the centroid may not be accurate. For example, in a 10-dimensional data space, the ratio of the volume of a sphere with radius 0.9 r and r, is given by $0.9^{10} \approx 0.348$. Hence, approximately 65% of the volume of the sphere with radius r is in the outer shell of the sphere, and is associated with 10% of the radius. Accordingly, assuming that many of the data values of a spherical cluster reside near the outer shell may be a proper assumption.

Suppose that data values of a cluster are uniformly distributed about the centroid. It is possible to derive the following result.

Let S be a sphere of radius $R_0$ in an n-dimensional data space containing N uniformly distributed data values. The mean $\mu$ and the standard deviation $\sigma$ of the distance of the data values from the center of the sphere are given by $$\mu = R_0 \cdot \frac{n}{n+1}$$
$$\sigma = R_0 \cdot \frac{1}{n+1} \cdot \sqrt{\frac{n}{n+2}}.$$

The above result shows that in high-dimensional spaces $\mu+\sigma$ is a good approximation of the radius $R_0$ of the sphere S. Therefore, assuming that points in a cluster are uniformly distributed, the above proposition shows that $\bar{\mu}+\bar{\sigma}$ may be a good approximation for the radius of an encapsulation sphere.

Figure 7:
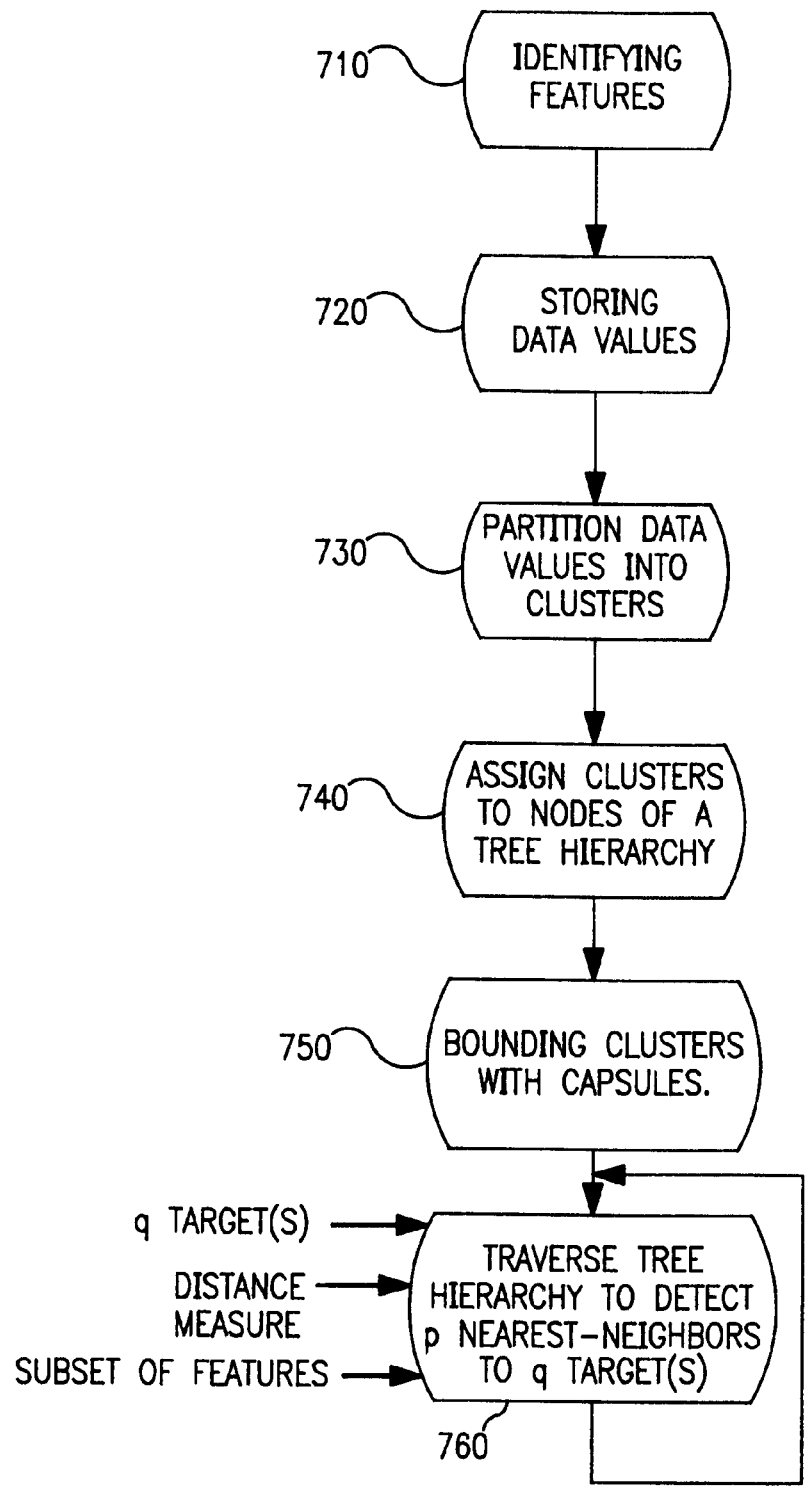
FIG. 7 is a flow chart diagram which is useful for explaining a method of analyzing information in a database in accordance with an exemplary embodiment of the present invention.

FIG. 7 is a flow chart diagram which is useful for explaining a method of analyzing information in a database in accordance with an exemplary embodiment of the present invention. Steps 710 through 740 of FIG. 7 are identical to steps 110 through 140 of FIG. 1. In step 750 each cluster is bounded by an approximating capsule, as detailed in the foregoing. In step 760 the tree hierarchy is traversed to detect p nearest-neighbors to q target value(s). In other words, a branch and bound method may be applied to the tree hierarchy to detect p data values in the database that are nearest, in terms of a given distance measure, to q target value(s). Distances from target value(s) to clusters (assigned to nodes in the tree hierarchy) are estimated by calculating distances to the surface of the bounding capsules found in step 760. The target value(s), the number of nearest-neighbors sought, and the distance measure may be specified by a user. Note that when multiple target values are specified and/or multiple nearest-neighbors are sought, then the distance from the target(s) to the nearest-neighbor(s) may be defined, for example, as the average distance. Thus, the distance between q target value(s) $\{t^1, \ldots, t^q\}$, and p nearest-neighbor(s) $\{y^1, \ldots, y^p\}$ (or nearest-neighbor candidates) may be given by $$\frac{1}{p \cdot q} \sum_{i=1}^{q} \sum_{j=1}^{p} \|y^j - t^i\|.$$

Moreover, the calculation of distances may be performed with respect to a subspace defined by a user specified subset of interesting features F.

Figure 8:
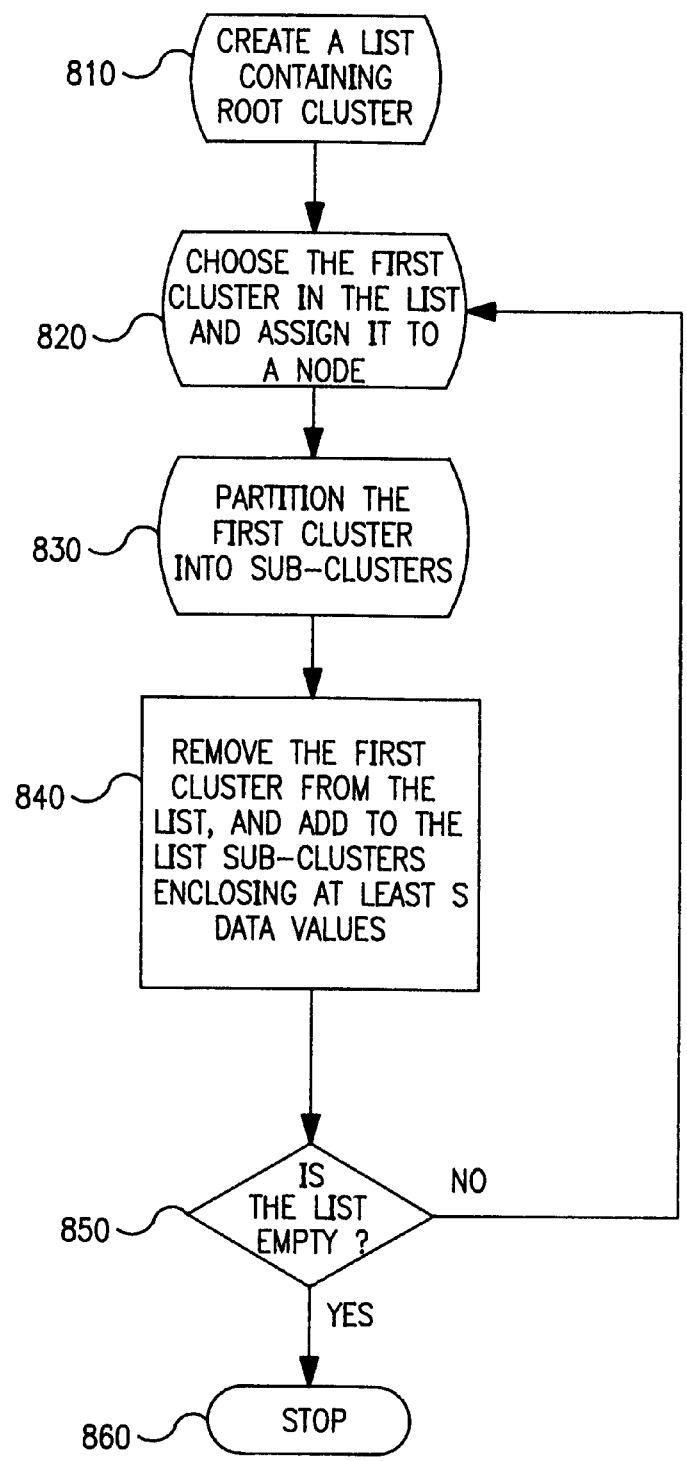
FIG. 8 is a flow chart diagram of an exemplary recipe for hierarchically partitioning a set of data values into clusters.

FIG. 8 is a flow chart diagram of an exemplary recipe for hierarchically partitioning a set of data values into clusters. In step 810 a list is created containing a root cluster. The root cluster may be, for example, a cluster containing all the data values in the database. In step 820 the first cluster is chosen from the list and assigned to a node in a tree hierarchy. The first cluster may itself be partitioned, in turn, into another set of clusters (sub-clusters) in step 830. In step 840 the first cluster is removed from the list. Additionally in step 840, each sub-cluster generated in step 830, which includes less than a predetermined number of data values (say s), is added to the list. In step 850 a decision is made as to whether the list has emptied. If the list has emptied the procedure terminates in step 860. If the list still contains cluster then step 820 through 850 are repeated.

Figure 9:
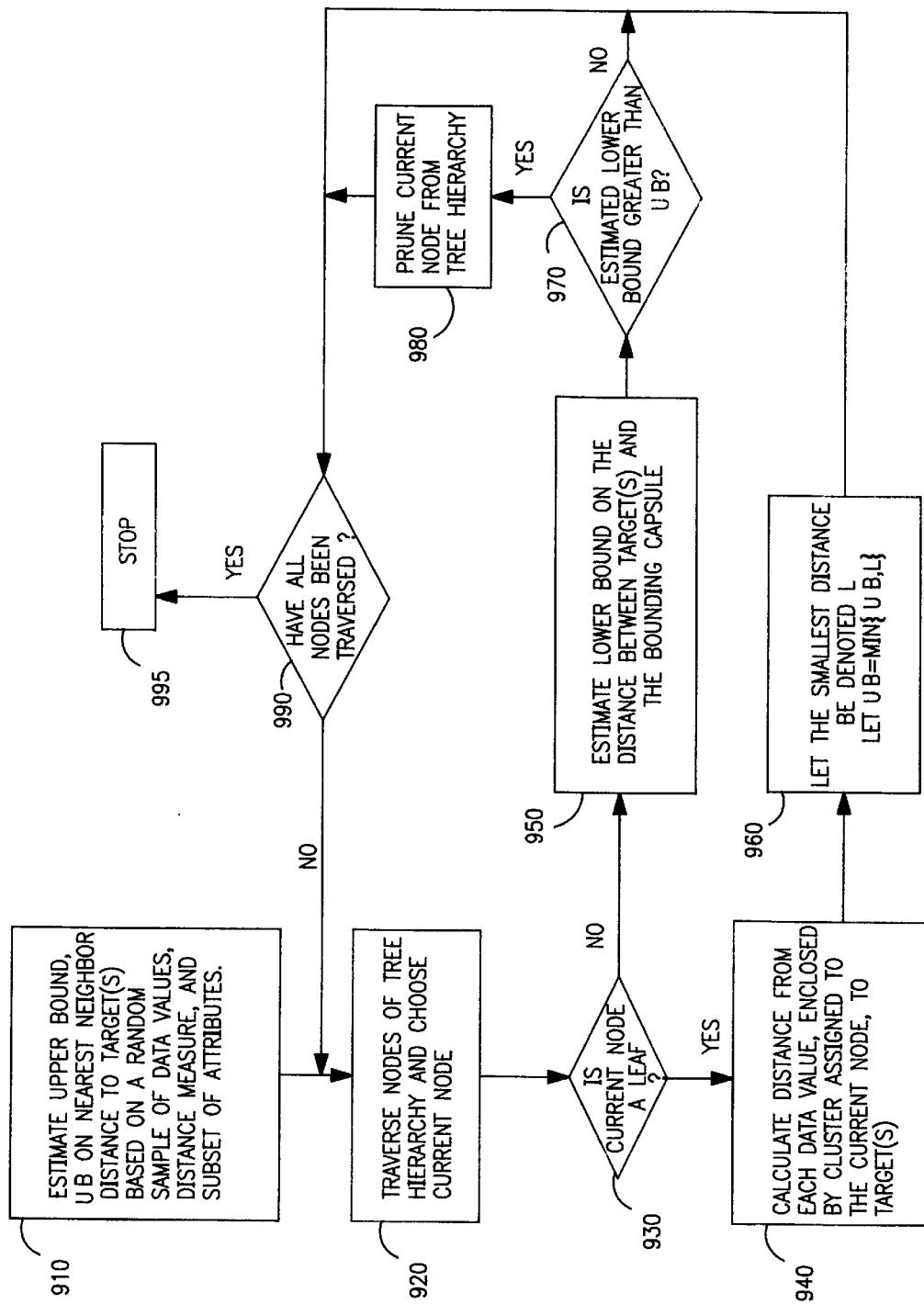
FIG. 9 is a flow chart diagram illustrating an exemplary recipe for performing a branch and bound method to detect nearest-neighbor data value(s) to target value(s)

FIG. 9 is a flow chart diagram illustrating an exemplary recipe for performing a branch and bound method to detect nearest-neighbor data value(s) to target value(s). In step 910 an initial estimate is calculated for the (global) upper bound, say UB. That is, UB is the estimated (global) upper bound on the distance between the p nearest neighbor(s) to the q target value(s). UB may be calculated by taking a random sample of data values in the database and calculating the distance to the target value(s). As noted above, the distance is calculated based on a distance measure, and a subset of interesting attributes provided by a user. In step 920 the nodes of the tree hierarchy are traversed and a current node is chosen according to the order of descent into the tree. In step 930 a decision is made as to whether the current node is a leaf of the tree hierarchy. If the current node is a leaf step 940 is proceeded with, whereas if the current node is not a leaf step 950 is proceeded with.

In step 940 the distance from each data value, included in the cluster assigned to the current node, to the target value(s) is computed. If the least of these distances, say L, is less than UB then UB is reset to L. In step 950 an estimate of the (local) lower bound on the distance between the target value(s) and the bounding capsule, for the cluster assigned to the current node, is calculated. In step 970 a decision is made as to whether the estimate of the (local) lower bound on the distance from the target value(s) to the bounding capsule is greater than UB. If the (local) lower bound is greater than UB then the current node (and all of its sub-nodes) may be pruned from the tree hierarchy in step 980. Otherwise, a decision is made in step 990 as to whether the entire tree hierarchy has been traversed. If the entire tree has been traversed then the procedure terminates in step 995. Otherwise, steps 920 through 990 are repeated.

The recipe given by the flow chart diagram of FIG. 9, represents a method that may be performed in response to a user querying a database in search of P nearest neighbor data value(s) to q target value(s). Once p nearest neighbor(s) are detected in the database, a user may choose to narrow the search further. In other words, a user may choose to "zoom in" to detect p'<p nearest neighbors to the same target(s). In this case, the procedure given by the flow chart diagram of FIG. 9 may be repeated except that UB is initially set (step 910) to the distance between the, previously detected, p nearest neighbors, and only the portion of the tree hierarchy yet unpruned (step 920) need be traversed. In other words, the branch and bound method executed to detect p' nearest neighbors may begin with the state of the tree hierarchy at the end of the branch and bound method executed to detect p nearest neighbors.

A user querying a database may also choose to widen the search for p">p nearest neighbors. In other words, a user may choose to "zoom out" to detect p">p nearest neighbors to the same target(s). In this case, the procedure given by the flow chart diagram of FIG. 9 may be repeated except that the portion of the tree hierarchy yet unpruned may be traversed first to detect p" nearest neighbors to the target(s). UB may then be set to the distance between the p" nearest neighbors detected and the target(s). Second, the entire tree hierarchy may be traversed again, using the branch and bound method, with UB as an initial (global) upper bound.

Figure 10:
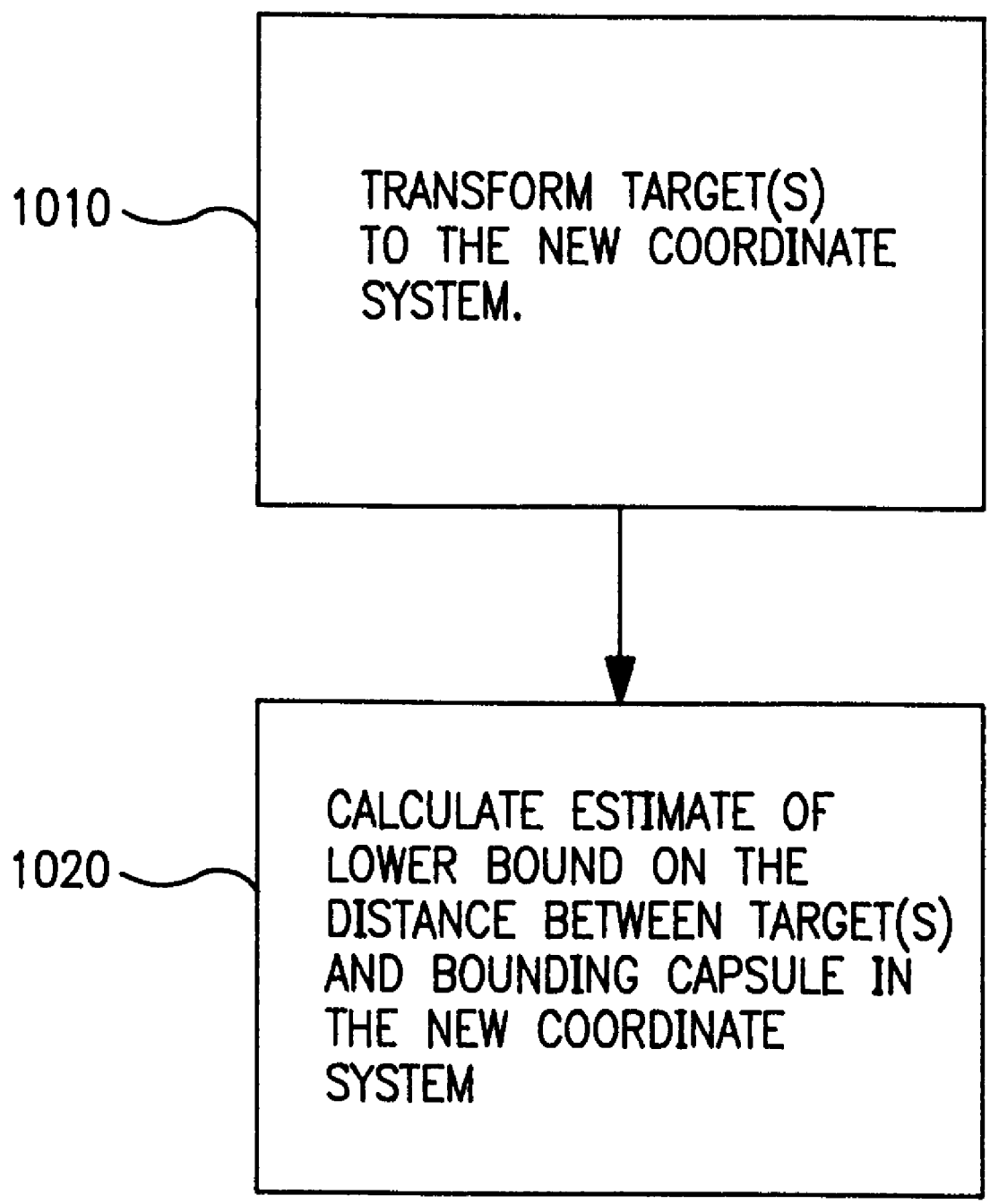
FIG. 10 is a flow chart diagram illustrating an exemplary recipe for calculating the distance between the target value (s) and a surface of a bounding capsule.

FIG. 10 is a flow chart diagram illustrating an exemplary recipe for calculating the distance between the target value (s) and a surface of a bounding capsule. In step 1010 the target value(s) are transformed to a new coordinate system. As discussed in the foregoing, the calculation of equation(s) representing the surface of bounding capsules may be performed in a new coordinate system in which the capsule is aligned with the coordinates. Thus, for ease of computation of distances, it may be advantageous to transform the target value(s) to the new coordinate system. In step 1020 an estimate of the lower bound on the distance between target value(s) and the surface of the bounding capsule is calculated in the new coordinate system.

Figure 11:
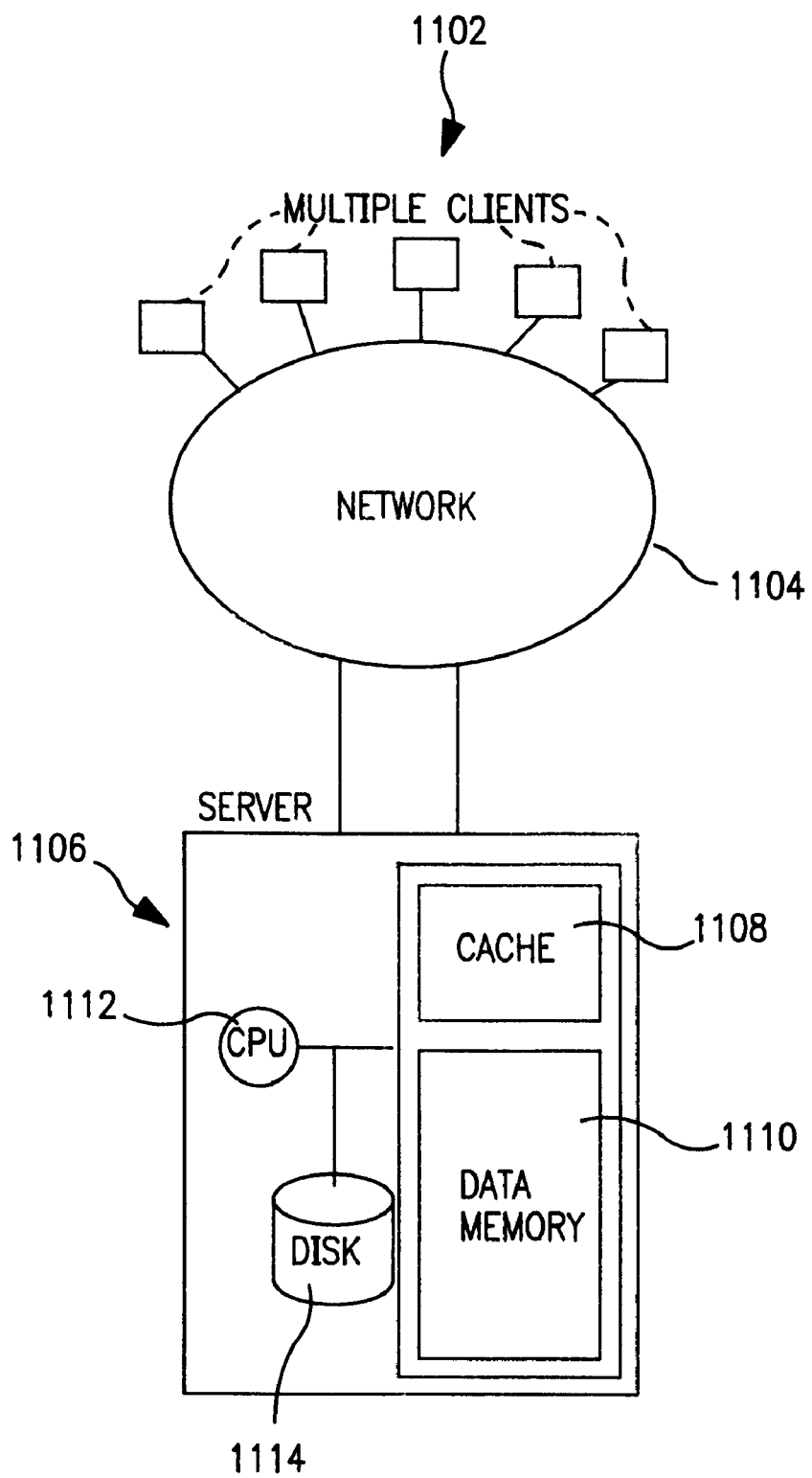
FIG. 11 is a block diagram of an apparatus for analyzing information over a computer network in accordance with an exemplary embodiment of the present invention.

FIG. 11 is a block diagram of an apparatus for analyzing information over a computer network in accordance with an exemplary embodiment of the present invention. In the embodiment depicted in FIG. 11, multiple client computers 1102 may access a server 1106, for example a Web server, over a network 1104. Server 1106 may have a data memory 1110 as well as a cache 1108. The server may further include a Central Processing Unit (CPU) 1112 for processing information and a disk 1114 for storing data. Data values may be collected from client computers 1102 by server 1106 over network 1104. Clients 1102 may also query server 1106 regarding the information stored in data memory 1110 and disk 1114. In particular, a client computer may supply server 1106 with q target value(s), a distance measure, a subset of interesting features, as well as the number of nearest-neighbors sought p. Server 1106 detects p nearest-neighbors, stored in a database on disk 1114 and in data memory 1110, and sends the analysis results back to the client computer. The results of the analysis and the nearest-neighbors detected may be displayed to a user at the client computer end, for example, either in the form of text or in graphical form.

E-COMMERCE EXAMPLE

The following definitions are helpful in understanding the e-commerce example:

e-commerce: e-commerce denotes Electronic Commerce. Electronic commerce refers to the process of trading goods and commodities by electronic means, for example, purchases made over the Internet. The increasing popularity of the Internet has made e-commerce applications of commercial importance. One aspect e-commerce applications is the availability of transaction histories for customers. Databases may be maintained for different consumers. The information stored in these databases may be analyzed for the purpose of providing product recommendations to customers concerning, for example, items for sale.

Recommendations: In an e-commerce application it may be desirable to predict the purchasing characteristics of individual customers. Purchasing behavior predictions may be made by analyzing information stored in a database of transaction records. Computer technology enables databases of information regarding a customer's transaction history to be maintained. It may be desirable, for example for marketing purposes, to predict the types of products which may be preferred by a customer. Information stored in customer transaction databases may be analyzed to detect customers that exhibit "similar" purchasing behavior. The set of customers who are similar to a given target customer is referred to as a "peer group". Based on the purchasing behavior of the "peer group" it may be possible to predict the types of products which may be preferred by a target customer. The predicted (preferred) items may be provided to the target customer as a list of recommended items.

Promotion list: A promotion list is a list of items used to restrict the number of products which may be recommended to a target customer. For example, although a hundred thousand items may be offered for sale by a retail organization, it may be desirable to restrict the recommended items to one hundred of the items. This restricted list is referred to as a promotion list. A promotion list may be used, for example, in order to promote the sale of specific products.

Peer group: A peer group is a group of L data values (transaction records) "similar" to m given target values. For example, each data value (transaction record) may correspond to a transaction or purchase made by a customer. Data values (transaction records) may be associated with items for sale. For example, a data value may be an n-tuple of quantities of items purchased a particular customer; i.e. n quantities (attributes) each corresponding to a different item for sale or product category. As a peer group is "similar" to m given target values, the purchasing patterns of the peer group may be used to make recommendations.

Collaborative filtering applications: collaborative filtering applications are applications in which the behavior of a peer group of target values may be used to provide recommendations. Consider, for example, a database containing information regarding the purchasing behavior of different supermarket customers. For each customer a database transaction record (data value) exists indicating the quantity of each item purchased. Hence, a transaction record may be an n-tuple of real numbers indicating the quantity of the item purchased (e.g. <3,3.96,100,0> corresponding to 3 golden delicious apples, 3.96 pounds of ground beef, and 100 grams of dark chocolate, and no muffins purchased). A target customer may thus be represented by an n-tuple of real numbers. A peer (nearest-neighbor) group of the target customer may be found by identifying n-tuples of real numbers in the database which are "similar", as discussed in the foregoing. L "similar" (or related) n-tuples comprising the peer group may be detected. Based on the purchases indicated by the peer group, recommendations may be made to the target customer.

Figure 12:
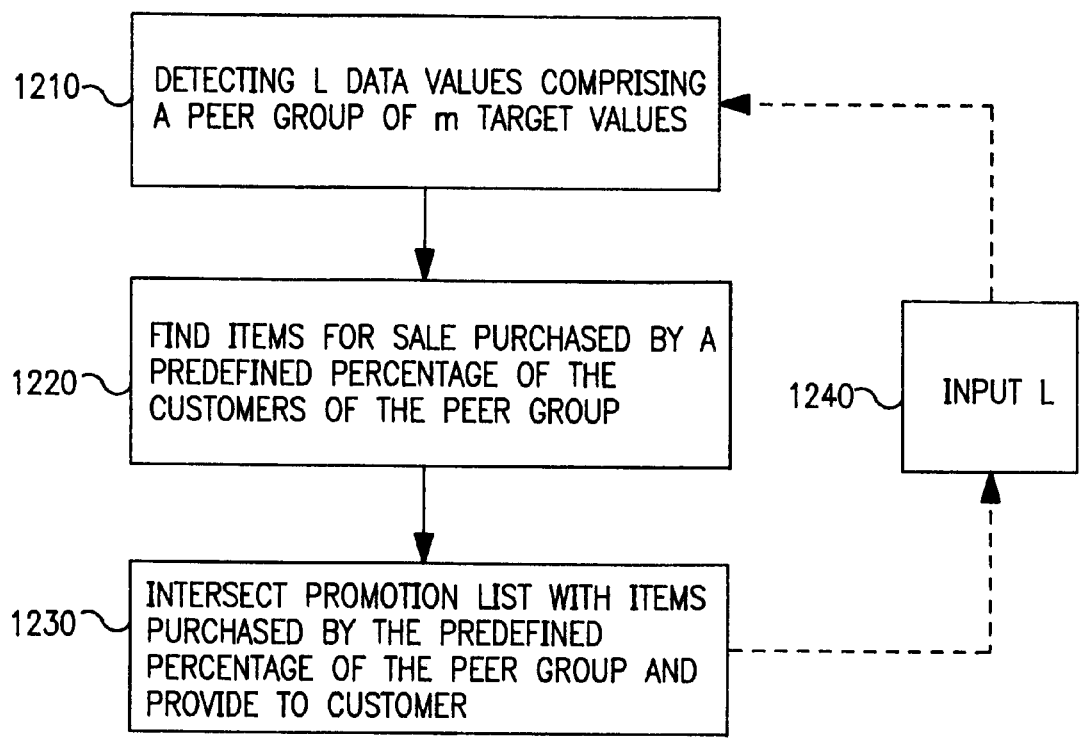
FIG. 12 is a flow chart diagram illustrating an exemplary interactive collaborative filtering application in accordance with an embodiment of the present invention.

FIG. 12 is a flow chart diagram illustrating an exemplary interactive collaborative filtering application. In step 1210 L data values (or transactions) that are comparable ("similar") to q target values are detected. Both the target values and the integer L may be defined by a user. The L data records may be detected, for example, using the method illustrated in the foregoing and in FIG. 7. In step 1220 a set of items which are associated with a nonzero quantity in some or all of the L detected data values is found. The set of items associated with a nonzero quantity (i.e. purchased by some or all of the peer group) may be, for example, identified as the set of items purchased in a predetermined percentage of the L detected data values. In step 1230 the set of items associated with a nonzero quantity is intersected with a promotion list. The items in the intersection may be, for example, provided to a customer. Note that the collaborative filtering application of FIG. 12 may be made interactive by allowing a user to vary L, for a fixed set of target values, for each repetition of steps 1210, 1220, and 1230. Step 1240 may be added to allow a user to interactively input L (the number of nearest-neighbors sought).

For example, suppose that for a target customer each of the nearest neighbors purchased at least one loaf of bread, one container of butter, one jar of jam, and one bottle of milk. A set of items which are associated with a nonzero quantity in all of the L detected data values is {Bread, Butter, Jam, Milk}. Suppose further that a supermarket chooses a promotion list {Bread, Milk, Sausage}. Then the items in the intersection, namely, {Bread, Milk}={Bread, Butter, Jam, Milk}∩{Bread, Milk, Sausage}, may be recommended to the target customer.

Figure 13:
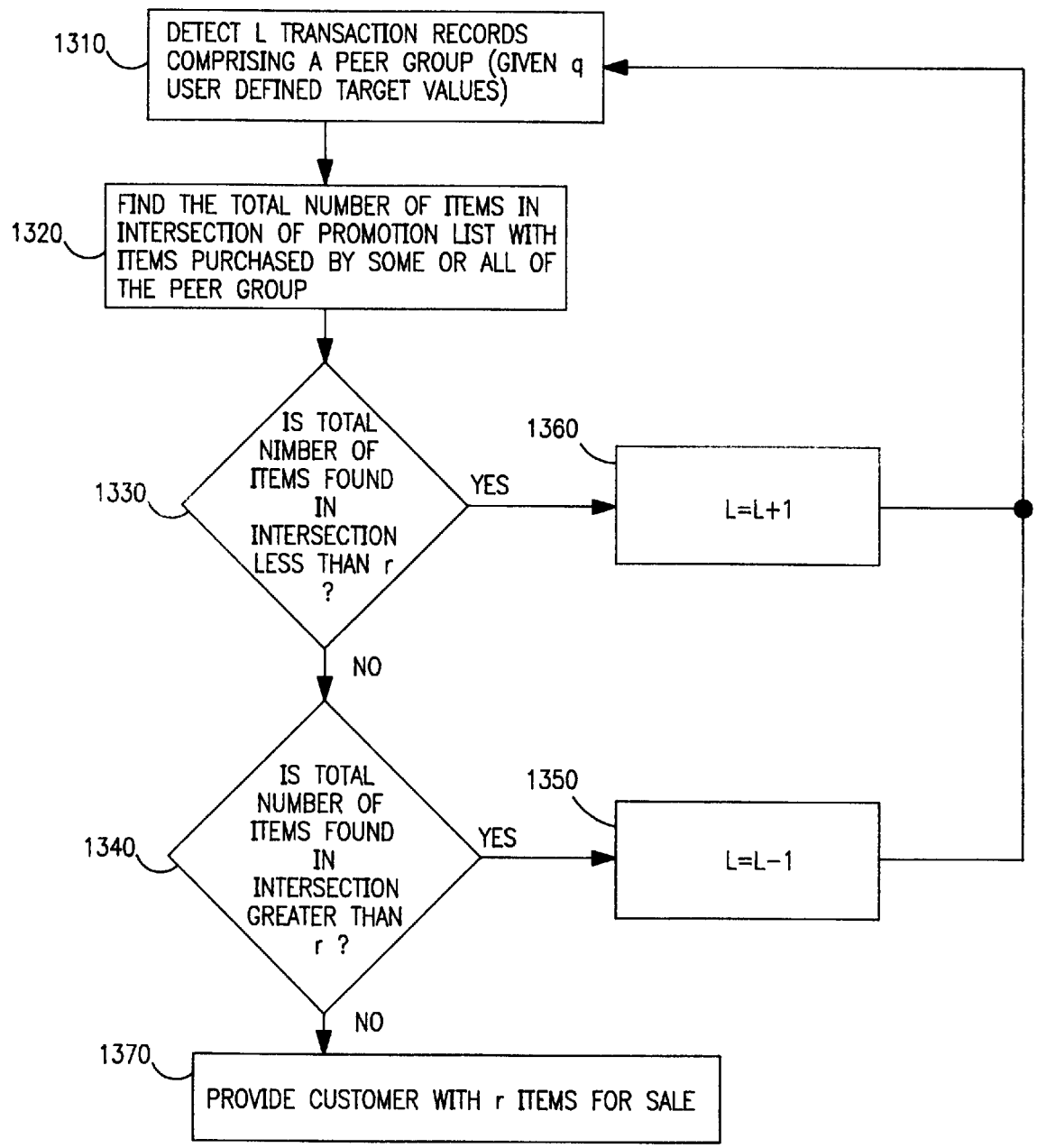
FIG. 13 is a flow chart diagram illustrating an exemplary collaborative filtering application in accordance with an embodiment of the present invention.

FIG. 13 is a flow chart diagram illustrating another exemplary collaborative filtering application. Given q user defined target values, in step 1310 L data values (or transactions) that are comparable ("similar") to q user defined target values are detected. The value of L may be initialized by a user. In step 1320 a set of items which are purchased by some or all of the L detected data records is found and is intersected with a promotion list. The total number of items in the intersection (preferred items to be provided to a customer) is stored. In step 1330 the total number of items in the intersection is compared with a given number, say r. If the total number of items is less than r then in step 1360 L is incremented, and steps 1310, 1320, and 1330 are repeated. Otherwise, a decision is made in step 1340 whether the total number of items is greater than r. If the total number of items in the intersection is greater than r then in step 1350 L is decremented, and steps 1310, 1320, and 1330 are repeated. If the number of items in the intersection is r, then these items are provided (recommended) to a customer in step 1370. One of ordinary skill in the art will readily recognize how to modify the method of FIG. 13, so that items may be provided to a customer if the number of items in the intersection is within a tolerance level of r, i.e. $r+e_{tl}$.

Although illustrated and described herein with reference to certain exemplary embodiments, the present invention is nevertheless not intended to be limited to the details shown. Rather, various modifications may be made in the details within the scope and range of equivalents of the claims and without departing from the spirit of the invention.

What is claimed:

1. A method of analyzing information in the form of a plurality of data values that represent a plurality of objects, said method comprising the steps of:
   (a) identifying a set of features that characterize each object of the plurality of objects;
   (b) storing the plurality of data values in a database, each of the plurality of data values corresponding to at least one of the plurality of objects based on the set of features;
   (c) partitioning ones of the plurality of data values stored in the database into a plurality of clusters;
   (d) assigning each cluster of the plurality of clusters one respective node of a plurality of nodes arranged in a tree hierarchy;
   (e) traversing ones of the plurality of nodes of the tree hierarchy.

2. The method according to claim 1, wherein each of the plurality of data values is an n-tuple corresponding to an instance of the set of features.

3. The method according to claim 1, wherein step (c) is repeated recursively until a respective total of ones of the plurality of data values of each respective cluster of the plurality of clusters is less than a predetermined number.

4. The method according to claim 1, further comprising the step of pruning at least one of the plurality of nodes of the tree hierarchy.

5. The method according to claim 1, further comprising the steps of:
   (f) calculating a distance between each cluster of the plurality of clusters assigned to one of the plurality of nodes traversed and at least one of a plurality of target values defined by a user; and
   (g) detecting at least one of the plurality of data values that is comparable to at least one of the plurality of target values based on the distance.

6. The method according to claim 5, wherein a predetermined number of ones of the plurality of data values that are comparable to one of the plurality of target values are detected.

7. The method according to claim 5, wherein a first predetermined number of ones of the plurality of data values that are comparable to a second predetermined number of ones of the plurality of target values are detected.

8. The method according to claim 5, wherein one of the plurality of data values that is comparable to a predetermined number of the plurality of target values is detected.

9. The method according to claim 5, wherein the step of detecting at least one of the plurality of data values that is comparable to at least one of the plurality of target values, further comprises the step of computing the distance between each one of the plurality of data values of one cluster of the plurality of clusters that is assigned to a node of the plurality of nodes of a lowest level of the tree hierarchy.

10. The method according to claim 5, further comprising the step of pruning at least one of the plurality of nodes of the tree hierarchy if the distance is greater than a predetermined upper bound.

11. The method according to claim 10, wherein k data values of the plurality of data values that are comparable to at least one of the plurality of target values are determined based on the distance, and to produce a pruned tree hierarchy.

12. The method according to claim 11, wherein steps (d)–(g) are repeated, replacing therein the tree hierarchy with the pruned tree hierarchy, to determine $p'<p$ data values of the plurality of data values that are comparable to at least one of the plurality of target values based on the distance.

13. The method according to claim 11, wherein steps (d)–(g) are repeated, replacing therein the predetermined upper bound with a new upper bound calculated based on the p data values, to determine $p'>p$ data values of the plurality of data values that are comparable to at least one of the plurality of target values based on the distance.

14. The method according to claim 5, further comprising the step of pruning at least one of the plurality of nodes of the tree hierarchy if the distance is less than a predetermined lower bound, and to produce a pruned tree hierarchy.

15. The method according to claim 14, wherein steps (d)–(g) are repeated, replacing therein the tree hierarchy with the pruned tree hierarchy, to determine $p'<p$ data values of the plurality of data values that are comparable to at least one of the plurality of target values based on the distance.

16. The method according to claim 14, wherein steps (d)–(g) are repeated, replacing therein the predetermined lower bound with a new lower bound calculated based on the p data values, to determine $p'>p$ data values of the plurality of data values that are comparable to at least one of the plurality of target values based on the distance.

17. A method of analyzing information in the form of a plurality of data values that represent a plurality of objects, said method comprising the steps of:
 (a) identifying a set of features that characterize each object of the plurality of objects;
 (b) storing the plurality of data values in a database, each of the plurality of data values corresponding to at least one of the plurality of objects based on the set of features;
 (c) partitioning ones of the plurality of data values stored in the database into a plurality of clusters;
 (d) assigning each cluster of the plurality of clusters one respective node of a plurality of nodes arranged in a tree hierarchy;
 (e) bounding each cluster of the plurality of clusters with a capsule;
 (f) traversing ones of the plurality of nodes of the tree hierarchy;
 (g) calculating a distance between the capsule bounding each cluster of the plurality of clusters assigned to one of the plurality of nodes traversed and at least one of a plurality of user defined target values;
 (h) detecting at least one of the plurality of data values that is comparable to at least one of the plurality of user defined target values based on the distance.

18. The method according to claim 17, wherein the capsule bounding each cluster of the plurality of clusters is oriented along an arbitrary direction.

19. The method according to claim 17, wherein calculating the distance comprises the steps of:
 (1) transforming ones of the plurality of target values to a new coordinate system; and
 (2) calculating the distance between a surface of the capsule bounding each cluster of the plurality of clusters assigned to one of the plurality of nodes traversed and at least one of the plurality of target values in the new coordinate system.

20. The method according to claim 17, wherein an interactively defined number L of the plurality of data values that are comparable to q user defined target values of the plurality of user defined target values are detected.

21. The method according to claim 20, wherein the plurality of data values correspond to a plurality of transaction records, the plurality of transaction records are associated with a plurality of items for sale, and the L data values detected correspond to L transaction records of the plurality of transaction records, the L transaction records comprising a peer group of the q user defined target values.

22. The method according to claim 21, wherein ones of the plurality of items for sale are provided to a customer based on an intersection between a promotion list and ones of the plurality of items for sale associated with ones of the L transaction records of the peer group.

23. The method according to claim 22, further comprising the steps of:
 (i) comparing a total number of the ones of the plurality of items for sale provided to the customer with a given value r;
 (j) repeating steps (f)–(h) to detect $L'<L$ transaction records comprising the peer group of the q user defined target values, if the total number of the ones of the plurality of items for sale provided to the customer is greater than r; and
 (k) repeating steps (f)–(h) to detect $L'>L$ transaction records comprising the peer group of the q user defined target values, if the total number of the ones of the plurality of items for sale provided to the customer is smaller than r.

24. The method according to claim 21, wherein the steps of the method are used for e-commerce.

25. A method of analyzing information in the form of a plurality of data values that represent a plurality of objects, said method comprising the steps of:
 (a) identifying a set of features that characterize each object of the plurality of objects;
 (b) storing the plurality of data values in a database, each of the plurality of data values corresponding to at least one of the plurality of objects based on the set of features;
 (c) partitioning ones of the plurality of data values stored in the database into a plurality of clusters;
 (d) assigning each cluster of the plurality of clusters one respective node of a plurality of nodes arranged in a tree hierarchy;
 (e) bounding each cluster of the plurality of clusters with a capsule;

(f) traversing ones of the plurality of nodes of the tree hierarchy;

(g) transforming ones of a plurality of target values defined by a user to a new coordinate system;

(h) calculating a distance between a surface of the capsule bounding each cluster of the plurality of clusters assigned to one of the plurality of nodes traversed and at least one of the plurality of target values in the new coordinate system;

(i) pruning at least one of the plurality of nodes of the tree hierarchy if the distance is greater than a predetermined upper bound; and (j) detecting at least one of the plurality of data values that is comparable to at least one of the plurality of target values based on the distance.

26. A method of analyzing information in the form of a plurality of data values that represent a plurality of objects, said method comprising the steps of:

(a) identifying a set of features that characterize each object of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) assigning each cluster of the plurality of clusters one node of a plurality of nodes arranged in a tree hierarchy;

(e) bounding each cluster of the plurality of clusters with a capsule;

(f) traversing ones of the plurality of nodes of the tree hierarchy;

(g) transforming ones of a plurality of target values defined by a user to a new coordinate system;

(h) calculating a distance between a surface of the capsule bounding each cluster of the plurality of clusters assigned to one of the plurality of nodes traversed and at least one of the plurality of target values in the new coordinate system;

(i) pruning at least one of the plurality of nodes of the tree hierarchy if the distance is less than a predetermined lower bound; and (j) detecting at least one of the plurality of data values that is comparable to at least one of the plurality of target values based on the distance.

27. An article of manufacture comprising a computer usable medium having computer readable program code means embodied therein for analyzing information in the form of a plurality of data values that represent a plurality of objects, the computer readable program code means in said article of manufacture comprising computer readable program code means for causing a computer to effect:

(a) identifying a set of features that characterize each object of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) assigning each cluster of the plurality of clusters one respective node of a plurality of nodes arranged in a tree hierarchy;

(e) bounding each cluster of the plurality of clusters with a capsule;

(f) traversing ones of the plurality of nodes of the tree hierarchy;

(g) calculating a distance between the capsule bounding each cluster of the plurality of clusters assigned to one of the plurality of nodes traversed and at least one of a plurality of user defined target values;

(h) detecting at least one of the plurality of data values that is comparable to at least one of the plurality of user defined target values based on the distance.

28. An article of manufacture comprising a computer usable medium having computer readable program code means embodied therein for analyzing information in the form of a plurality of data values that represent a plurality of objects, the computer readable program code means in said article of manufacture comprising computer readable program code means for causing a computer to effect:

(a) identifying a set of features that characterize each object of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) assigning each cluster of the plurality of clusters one respective node of a plurality of nodes arranged in a tree hierarchy;

(e) traversing ones of the plurality of nodes of the tree hierarchy.

29. A computer program product comprising a computer usable medium having computer readable program code means embodied therein for causing an analysis of information in the form of a plurality of data values that represent a plurality of objects, the computer readable program code means in said computer program product comprising computer readable program code means for causing a computer to effect:

(a) identifying a set of features that characterize each object of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) assigning each cluster of the plurality of clusters one respective node of a plurality of nodes arranged in a tree hierarchy;

(e) traversing ones of the plurality of nodes of the tree hierarchy.

30. A computer program product comprising a computer usable medium having computer readable program code means embodied therein for causing an analysis of information in the form of a plurality of data values that represent a plurality of objects, the computer readable program code means in said computer program product comprising computer readable program code means for causing a computer to effect:

(a) identifying a set of features that characterize each object of the plurality of objects;

(b) storing the plurality of data values in a database, each of the plurality of data values corresponding to at least one of the plurality of objects based on the set of features;

(c) partitioning ones of the plurality of data values stored in the database into a plurality of clusters;

(d) assigning each cluster of the plurality of clusters one respective node of a plurality of nodes arranged in a tree hierarchy;

(e) bounding each cluster of the plurality of clusters with a capsule;

(f) traversing ones of the plurality of nodes of the tree hierarchy;

(g) calculating a distance between the capsule bounding each cluster of the plurality of clusters assigned to one of the plurality of nodes traversed and at least one of a plurality of user defined target values;

(h) detecting at least one of the plurality of data values that is comparable to at least one of the plurality of user defined target values based on the distance.

* * * * *